Feb. 10, 1948.  A. L. QUINLAN  2,435,795
TAPE DISPENSING APPARATUS
Filed Feb. 10, 1945
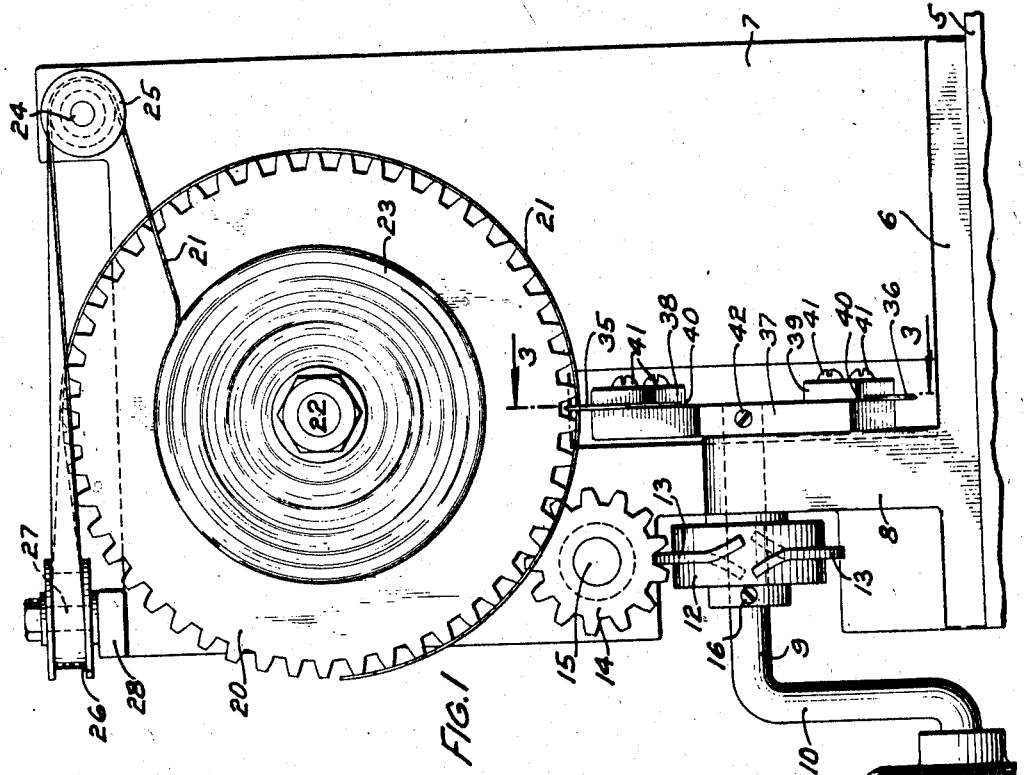
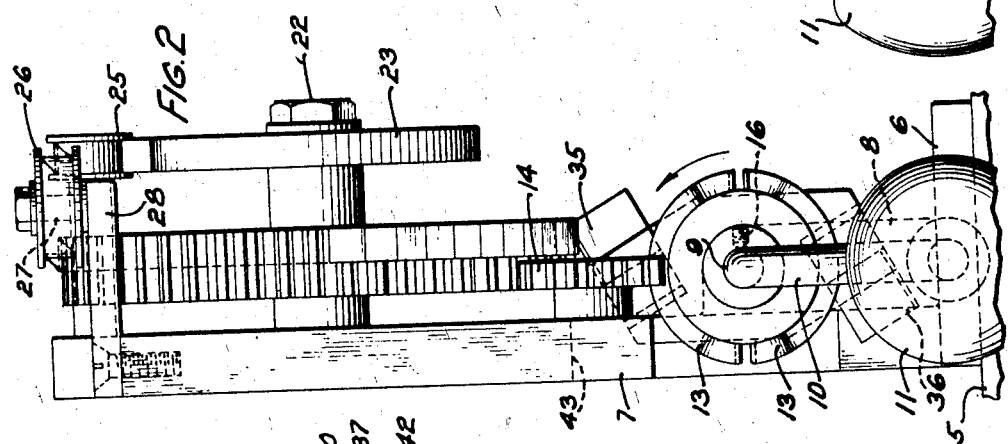
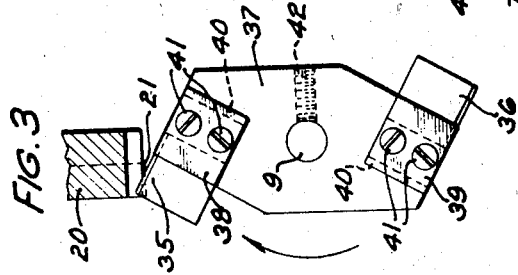
INVENTOR
A. L. QUINLAN
BY *Harry R. Duft*
ATTORNEY Patented Feb. 10, 1948

2,435,795

UNITED STATES PATENT OFFICE 2,435,795

TAPE DISPENSING APPARATUS

Amos L. Quinlan, La Grange Park, Ill., assignor to Western Electric Company, Incorporated, New York, N. Y., a corporation of New York Application February 10, 1945, Serial No. 577,313

12 Claims. (Cl. 164—68)

This invention relates to tape dispensing apparatus and more particularly to an apparatus for dispensing short lengths of pressure adhesive tape and automatically severing said short lengths from a supply thereof.

It is an object of the present invention to provide a simple and efficient apparatus for rapidly dispensing tape.

In accordance with one embodiment of the invention, a pad of pressure adhesive tape is mounted for rotation on a shaft on which there is also mounted a gear having teeth provided with relatively large surfaces at the periphery of the gear. The tape is withdrawn from the pad and directed to engagement with the peripheral surfaces of the teeth of the gear by suitable guide rollers and the gear is intermittently driven through an idler actuated by a spiral gear of such configuration that, constant rotation being imparted to the shaft on which the spiral gear is mounted, the spiral gear will impart an indexing movement or intermittent rotation to the idler. Mounted upon the shaft which supports the spiral gear are a pair of tape cutting knives positioned to sever the tape adhered to the large gear at a point midway between the teeth on the large gear and these knives are so positioned on their shaft that they will be effective to cut the tape intermediate steps of rotation of the gear during its stationary interval.

A complete understanding of the invention may be had by reference to the following detailed description when considered in conjunction with the accompanying drawings, wherein Fig. 1 is a side elevational view of an apparatus embodying the invention;

Fig. 2 is an end elevational view of the apparatus shown in Fig. 1; and

Fig. 3 is a detail sectional view taken substantially along the line 3—3 of Fig. 1 in the direction of the arrows.

Referring to the drawing, wherein like reference characters designate the same parts throughout the several views, it will be seen that the apparatus is adapted to be mounted upon a suitable table or base 5 and includes two frame members in the form of a base plate 6, and an upright support plate 7, to which the base plate is suitably secured. Fixed to the base plate 6 and upright support plate 7 is a bearing block 8, which serves the dual purpose of acting as a bearing and also serves to rigidly interconnect the upright support plate and base plate. The bearing block 8 has journalled in it a shaft 9 having formed integrally with it a crank 10, on the end of which there is mounted a handle 11. By means of the handle 11, rotation may be imparted to the shaft 9, which carries a spiral gear 12 fixed to it by means of a set screw 16. The spiral gear 12 has two sets of spiral teeth 13—13 formed on it, each of which is so formed that, by their cooperative action, one complete revolution of the shaft 9 will result in an idler gear 14 being advanced through a distance equal to two of its teeth. The idler 14 is mounted upon a stud shaft 15 fixed in the upright plate 7 and is in position to mesh with the teeth 13—13 of the spiral gear 12. Each of the teeth 13 of the spiral gear is formed so that it will be effective to advance the gear 14 at the beginning and end of its engagement with the gear 14, but will be effective to hold the gear 14 stationary for an appreciable length of time intermediate the movements thereof.

As will be seen by reference to Fig. 2, the idler gear 14 engages the teeth of a large tape serving gear, wheel or drum 20, which is much thicker than the gear 14, thus providing an appreciable area of the peripheral faces of the teeth of the gear 20 for engagement by a strip of pressure adhesive tape 21, which is appreciably narrower than the gear 20. The gear 20 is freely rotatable upon the end of a stud shaft 22, which is, in turn, fixed to the upright plate 7 and carries, in addition to the gear 20, a tape pad 23, also freely rotatable on the shaft. The gear 20 and pad 23 may be held on the shaft 22 by any suitable means, for example, by means of the nut 23 and, in the operation of the apparatus, they will both rotate in the same direction, but at different speeds.

Mounted upon the upright supporting plate 7 is a stud shaft 24, carrying a guide pulley 25 in alignment with the tape pad 23 for guiding tape 21 withdrawn from the tape pad 23. The guide pulley 25 serves to guide the tape to a second guide pulley 26, which is freely rotatable on a stationary shaft 27, which is, in turn, mounted on a bracket 28 fixed to the upright supporting plate 7. The pulley 26 is so positioned that it will direct tape withdrawn from the pad 23 and passed over the pulley 25 to the tape serving gear 20. It should be noted that the pressure adhesive tape 21, drawn from the pad 23, is passed over the pulley 25 with its non-adhesive side engaging the drum of the pulley 25 and, similarly, the tape is guided over the pulley 26 so that its non-adhesive side will engage the drum of the pulley and will guide the tape to position where its adhesive side will engage with the teeth of the tape serving gear 20 to carry the tape past a pair of tape cutting knives 35 and 36. The knives 35 and 36 are of exactly the same construction and are mounted upon a knife-carrying block 37 by means of clamps 38 and 39, respectively. The clamps 38 and 39 are of identically the same construction, each being provided with a rib 40, which bears against the block 37 and with retainer screws 41—41, which are threaded into the block 37 and tend to force the outer ends of the clamps 38 and 39 into clamping engagement with the knives 35 and 36. The knives 35 and 36 and their clamps 38 and 39, respectively, are disposed at a slight angle to the main body portion of the block 37 so that when the knives are operated, they will effect a slicing cut through tape 21 on the tape serving gear 20.

The block 37 is fixed to the shaft 9 by means of a set screw 42 and, upon rotation of the shaft 9, the knives 35 and 36 will alternately engage the tape 21 to cut it into small pieces, one piece adhering to each tooth of the tape serving gear 20. The knives 35 and 36 are so disposed with respect to the shaft 9 that they will be effective, at a time when the spiral teeth 13 on gear 12 are holding the idler 14 and serving gear 20 stationary. Due to their position with respect to the shaft 9, the knives 35 and 36 will be completely disengaged from the tape and out of the path of movement of the gear teeth on tape serving gear 20 at all times that the spiral teeth 13 are advancing the gear 20.

In the operation of the apparatus, small pieces of pressure adhesive tape 21 may be formed by simply rotating the shaft 9 through the operation of the handle 11. When the shaft 9 is rotated, it will impart intermittent motion to the tape serving gear, wheel or drum 20 through the idler 14 and, when the tape serving gear is stationary, the knives 35 and 36 will cut the tape 21 at approximately the middle of the space between two adjoining teeth of the gear, wheel or drum 20 on which the tape is adhered. In order to permit rotation of the knives 35 and 36, it should be noted that the upright supporting plate 7 is cut away as shown at 43.

What is claimed is:

1. In a dispensing apparatus for pressure adhesive tape, means for rotatably supporting a supply of tape, a rotatable toothed tape serving drum positioned to receive the adhesive side of the tape on the projecting surfaces of its teeth, means for imparting intermittent rotation to said tape serving drum, and a knife rotatable on an axis at right angles to the axis of rotation of the serving drum intermediate periods of rotation of the tape serving drum for cutting the tape adhered to the teeth of the toothed drum at a point between the points of adherence of the tape to the teeth.

2. In a pressure adhesive tape serving apparatus, a shaft for rotatably supporting a supply of pressure adhesive tape, a tape serving drum having spaced tape receiving surfaces on said shaft and positioned to receive the adhesive side of the tape on the projecting surfaces of its teeth, means for guiding the tape to adhesive engagement with the surfaces of said drum, means for imparting step by step rotation to said tape serving drum, rotary means for cutting tape adhered to the tape serving drum intermediate step by step movements thereof at a point between the points of adherence of the tape to the teeth, and a common drive means for the tape serving drum and cutting means.

3. In a pressure adhesive tape dispensing apparatus, a toothed tape serving member, means for supporting said member for rotation, means for directing pressure adhesive tape to engagement with the teeth on said serving member, means for imparting intermittent step by step rotation to said serving member, means for cutting the tape adhered to the teeth of said serving member, and a shaft disposed substantially at right angles to the axis of rotation of the tape serving member for supporting and actuating the cutting means and the means for imparting step by step rotation to the serving member.

4. In an apparatus for serving sections of pressure adhesive material, a support for a roll of material, a feeding and delivering member having a plurality of spaced supports for adhesive engagement by said material, means for imparting step by step movement to said feeding and delivering member, means operable intermediate step by step movement of the feeding and delivering member for cutting the material in the area between adjacent supports, and a drive shaft having its axis in a plane at an angle to the plane of the axis of the roll of material for driving the cutting means and movement imparting means.

5. In a machine for dispensing lengths of pressure sensitive adhesive tape, in combination, a feed device for withdrawing the tape from a source of supply, said device including a plurality of spaced surfaces of sufficient area to provide effective adhesion for a length of tape, means for supporting said adhesion surfaces for movement in an orbital path, means for severing the leading end of the tape in rear of a surface to which the leading end is adhered, whereby the severed length will be retained by adhesion to such surface for delivery to the operator, a drive shaft for imparting continuous rotary movement to the severing means, and means mounted on the drive shaft for imparting intermittent movement to the feed device.

6. In a machine for dispensing lengths of pressure sensitive adhesive tape, in combination, a feed device for withdrawing the tape from a source of supply, said device including a plurality of spaced surfaces of sufficient area to provide effective adhesion for a length of tape, means for supporting said adhesion surfaces for movement in an orbital path, means for severing the leading end of the tape in rear of a surface to which the leading end is adhered, whereby the severed length will be retained by adhesion to such surface for delivery to the operator, a drive shaft for supporting and actuating said severing means, and means on said drive shaft for imparting intermittent movement to the feed device, said drive shaft supporting the severing means in position to sever the tape intermediate intermittent movements of the feed device.

7. In a device for dispensing pressure adhesive tape, means for supporting a supply roll of tape, a rotary tape dispensing wheel in peripheral engagement with the adhesive side of the tape as it is withdrawn from the supply roll, said wheel having a transverse peripheral groove, tape severing means movable through said groove, a drive shaft having its axis disposed at right angles to the axis of said wheel, means on the drive shaft for imparting step by step rotation to the wheel, and means on the shaft effective to cut the tape on the wheel intermediate the steps of rotation thereof.

8. In a device for dispensing pressure adhesive tape, means for supporting a supply roll of tape, a rotary tape dispensing wheel in peripheral engagement with the adhesive side of the tape as it is withdrawn from the supply roll, said wheel having a transverse peripheral groove, a drive shaft, means on said drive shaft for actuating said wheel intermittently, and means also on said drive shaft for movement through the groove to cut the tape while the wheel is not being actuated by its actuating means.

9. In a device for dispensing pressure adhesive tape, means for supporting a supply roll of tape, a rotary tape dispensing wheel in peripheral engagement with the adhesive side of the tape as it is withdrawn from the supply roll, said wheel having a transverse peripheral groove, a drive shaft, an alternately effective and ineffective driving connection between said shaft and said wheel, and a rotary tape cutter actuated by the drive shaft to cut the tape when the driving connection is ineffective.

10. An apparatus for dispensing pressure adhesive tape comprising a feed wheel having a plurality of spaced tape receiving surfaces, a rotary severing means having a blade and rotatable on an axis substantially perpendicular to the axis of rotation of said feed wheel, means for imparting intermittent rotation to said feed wheel, and means of connection between said feed wheel and severing means for causing said blade to pass in the spaces between the tape receiving surfaces of said feed wheel during its stationary interval.

11. An apparatus for dispensing pressure adhesive tape comprising a feed wheel having a plurality of spaced tape receiving surfaces, a rotary cutter having a blade movable in a circular path transversely through the periphery of said feed wheel, means for intermittently rotating said feed wheel, and means of connection between said feed wheel and cutter for causing the blade of the cutter to pass through the periphery of the feed wheel in the spaces between the tape receiving surfaces thereof during a stationary interval of the feed wheel.

12. In an apparatus for serving pressure adhesive tape, a toothed tape supporting wheel for receiving and supporting the pressure adhesive tape on one side of the peripheral surface thereof, an intermittently actuated feed gear meshing with said toothed gear adjacent the other side of the peripheral surface thereof, tape severing means for cutting tape between the teeth on said toothed wheel, and means for driving the tape severing means and intermittently actuated feed gear.

AMOS L. QUINLAN.

REFERENCES CITED

The following references are of record in the file of this patent:

UNITED STATES PATENTS

| Number | Name | Date |
|---|---|---|
| 2,098,413 | Daneke | Nov. 9, 1937 |
| 2,205,036 | Hamel | June 18, 1940 |
| 2,241,658 | Engberg | May 13, 1941 |
| 2,274,623 | Hawkins | Feb. 24, 1942 |
| 2,298,360 | Fitch | Oct. 13, 1942 |
| 2,326,917 | Anderson | Aug. 17, 1943 |
| 2,384,575 | Stull | Sept. 11, 1945 |